[Patent header omitted]

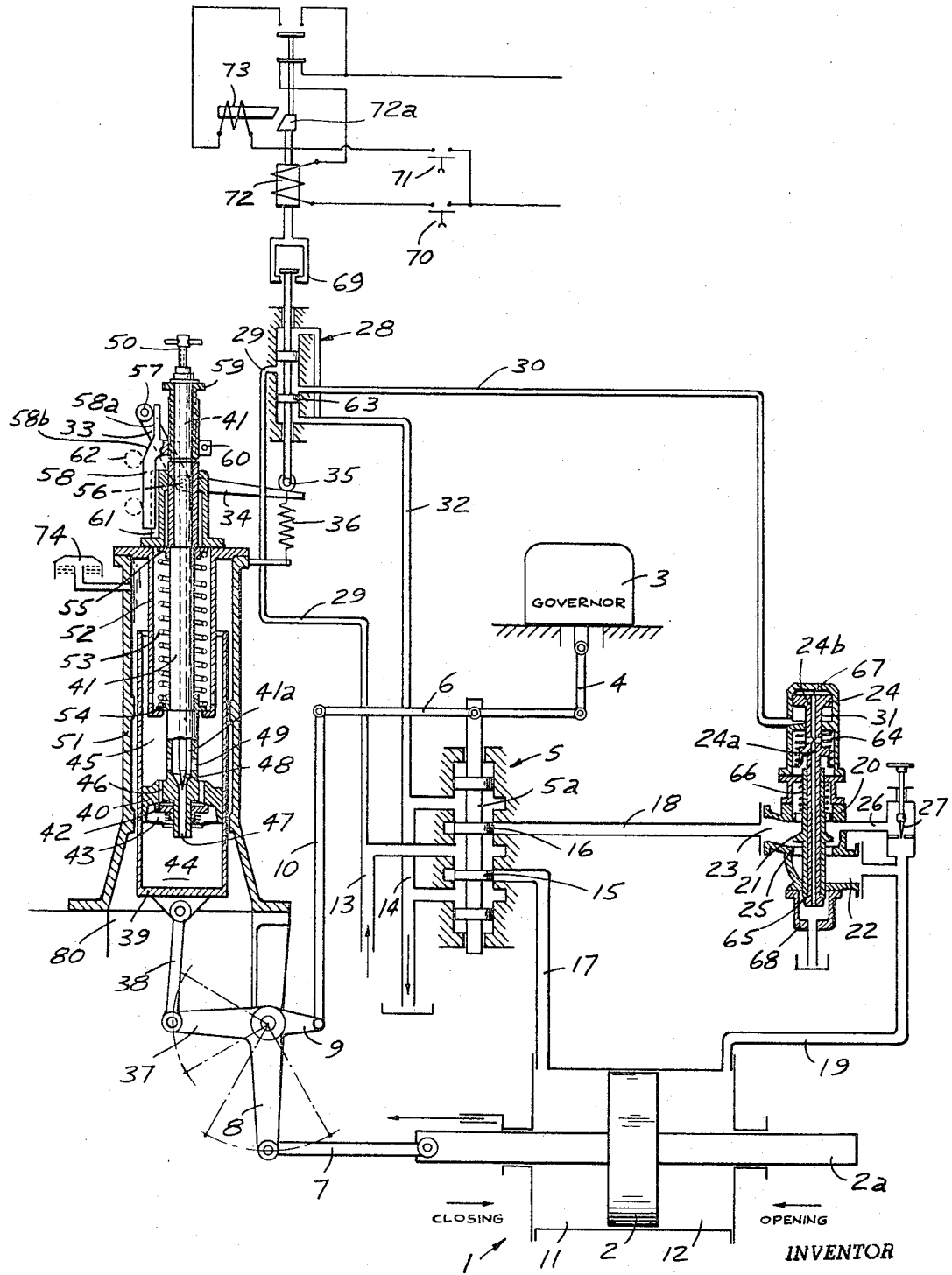

3,332,431
CONTROL DEVICE FOR A TURBINE
Axel Viktor Linder, Trollhattan, Sweden, assignor to Nydqvist & Holm Aktiebolag, Trollhattan, Sweden, a firm of Sweden
Filed Apr. 7, 1965, Ser. No. 446,181
Claims priority, application Sweden, Apr. 13, 1964, 4,537/64
10 Claims. (Cl. 137—36)

The present invention relates to water turbines, the spent water of which is discharged through ducts usually of considerable length, and more particularly to a regulating device for turbine installations in which surge tanks are included in the discharge or drainage ducts.

Such surge tanks serve to equalize the pressure surges which occur in the ducts due to changes in the flow of discharged water when the load demand on the turbine changes. The tanks are usually placed close to the downstream end of the outlet of the suction tubes of the turbines. The required capacity of the surge tanks depends upon the length and the cross-sectional area of the ducts and also upon the volume of drained water which must be accommodated as the flow of water increases when the load demand on the turbines increases. Percentagewise, the increase of the load on the turbines may not be very large. For instance, when in a large power plant several turbines are coupled to a common power output, a substantial and rapid increase in the load demand at the common output will not result in a very substantial load increase on the individual turbines.

Even for a turbine operated singly, rapid increases in load demand practically never exceed 40% of the total power of the turbine. Nevertheless, it is a generally accepted practice to provide large surge tanks for safety reasons, and such large tanks are correspondingly expensive in construction and maintenance.

It is a broad object of the invention to provide a novel and improved device for water turbine installations of the general kind above referred to which permits the use of much smaller surge tanks than was possible heretofore, while fully satisfying the most exacting safety requirements.

A more specific object of the invention is to provide a novel and improved device of the general kind above referred to which coacts with the conventional speed responsive governor of the turbine and permits a rapid opening of the turbine within a range adjustable from close to zero to a maximum of about 40% of the total power of the turbine in response to an increase in the load demand on the turbine, but is independent of the setting of the turbine at the moment at which the increase in the load demand occurs.

Another more specific object of the invention is to provide a novel and improved device of the general kind above referred to which in response to a load increase in excess of the upper limit set for the rapid opening of the turbine automatically shifts to a slower opening time, such that the discharge flow reaching the surge tank does not increase the water level therein above a predetermined maximum.

Still another more specific object of the invention is to provide a novel and improved device of the general kind above referred to which does not affect the closing time of the turbine for which the governor is set in response to a decrease in the load demand, and such independence of the governor function is maintained irrespective of the setting of the device according to the invention.

Other and further objects, features and advantages of the invention will be pointed out hereinafter and will be set forth in the appended claims constituting part of the application.

In the single figure of the accompanying drawing, a turbine control system including a regulating device according to the invention is diagrammatically shown.

*The structure of the regulating device and of the associated components*

The exemplified control system comprises a first servomechanism including a cylinder 1 and a piston 2 mounted on a piston rod 2a. The piston rod should be visualized as being coupled in a conventional manner to the guide or control wheel of a water turbine to be supervised. The position of the piston in the cylinder should always be such that the torque of the turbine corresponds to the load demand, whereby the rotational speed of the turbine is kept constant, or in any event, at the desired r.p.m.

The position of the piston is controlled by a speed responsive governor 3. This governor has an output shaft 4, the position of which changes in accordance with the speed detected by the governor and is continually followed by the servo piston 2.

To cause the piston to follow the positional changes of output shaft 4, the latter is coupled to a main pilot valve 5 by means of a balancing lever 6. The lever is further coupled by link 10, a bellcrank lever 9, 8 and a link 7 to piston rod 2a. The pilot valve continually controls the pressure in cylinder spaces 11 and 12. A suitable pressure medium, such as pressurized oil, is supplied to pilot valve 5 through a pipe 13 and discharged therefrom through a pipe 14. Pilot valve 5 includes control slides 15 and 16 fixedly secured on a valve shaft 5a for lengthwise displacement therewith in response to changes in the position of output shaft 4 of governor 3, as will be more fully explained hereinafter.

Slide 15 serves to control the pressure in cylinder space 11, and slide 16 in cylinder space 12. Pressurized oil is fed into the cylinder spaces and discharged therefrom through pipes 17, 18 and 19 in a manner which will be more fully described hereinafter.

All the structural components of the control system as hereinbefore described are standard components of a conventional governor-operated control system. In actual practice, the governor control system may contain additional structural components, but only those components are described and illustrated which are essential for the understanding of the invention.

Referring now to the regulating device according to the invention, the device as exemplified comprises a first control valve 20 connecting pipes 18 and 19. The valve has a lengthwise slidable valve member 21 coacting with a valve seat 25 formed in the housing of the valve to open or to close a connection between valve chambers 22 and 23. Chamber 22 is connected to pipe 19, and chamber 23 to pipe 18. The position of valve member 21 is controlled by a plunger 24 of a second servomechanism and will open when the oil pressure is higher in chamber 22 than in chamber 23. When the valve member is in its position on seat 25, oil to be fed into cylinder space 12 will pass through pipe 18, chamber 23, a pipe 26 extending from valve 20, and a throttling valve 27 connecting pipe 26 to pipe 19 issuing into chamber 12. The plunger 24 is controlled by a second control valve 28, which in turn controls the flow of oil from the supply pipe 13 through a pipe 30 leading to a chamber 31 of the second servomechanism provided below plunger 24 to press the same upwardly, as seen in the figure, when pressure is supplied to chamber 31. Valve 28 includes a control slide 63, which is shown in its lower or rest position. When the slide is moved upwardly, it opens a connection between pipe 30 and a pipe 32 connected to discharge pipe 14, thereby permitting drainage of oil from chamber 31 of valve 20. The position of valve 28 is controlled by a bellcrank lever 33, 34 pivotal about a pivot pin 56. Lever arm 34 coacts with a roller 35 on valve slide 63 and is pressed into engagement with the roller by a suitably loaded spring 36. In addition, the position of slide 63 may be manually controlled by electromagnetic means including solenoids 72 and 73 and switches 71 in a manner and for a purpose which will be more fully explained hereinafter. Solenoid 72 is coupled with slide 63 by a coupling means 69.

Movements of piston 2 in cylinder 1 are transmitted through link 7, bellcrank lever arms 8 and 37 and a further link 38 to a cylinder 39 of a third servomechanism dipping into an oil sump 80. A plunger 40 in cylinder 39 is mounted on a piston rod 41 including an axial bore 41a. Cylinder 39 includes two chambers 44 and 45 connected through bores 46. The flow of oil between chambers 44 and 45 is controlled by a reversing valve 42, which is biased into its closing position by a light spring 43. The valve is closed when cylinder 39 either is at rest or moves upwardly which is the direction for opening the turbine. When cylinder 39 moves downwardly, valve 42 opens the connection between chambers 44 and 45 through bores 46.

Chambers 44 and 45, in addition to being connectible by bores 46, are also in communication through a bore 47 controlled by a needle valve 48 and ports 49. The free flow area as opened or closed by valve 48 can be adjusted by means of a threaded spindle 50 extending through the bore 41a of piston rod 41. The connection between the two chambers through bore 47 and ports 49 serves to effect a time-controlled setting of the movement of plunger 40 in reference to the movement of cylinder 39.

Cylinder 39 and the components included therein are mounted within a stationary casing 51. A sleeve 52 is secured to casing 51 and accommodates a coil spring 53. This spring abuts at one end against a collar or washer 54 movable jointly with piston rod 41, and at the other end against a shoulder or collar 55 secured to a fixed portion of casing 51, whereby spring 53 can be more or less loaded by lifting collar 54 toward collar 55. The aforedescribed belcrank lever 33, 34 supports on its arm 33 a roller 57 which constitutes a cam follower coacting with a cam member 58. This cam member is coupled to piston rod 41 so that it will follow the axial displacements of the rod. The upper end of rod 41 mounted an adjustable sleeve 59 which has external threads in engagement with threads on a holder 60 for cam member 58 so that turning of sleeve 59 will cause a corresponding axial displacement of the cam member. The cam member is keyed at 61 to a portion of stationary casing 51 to prevent rotation of the cam member when and while the same is axially displaced.

As a result of a lengthwise displacement of cam member 58, cam follower 57 will move along the cam surface of member 58, one of the possible positions of the cam follower in reference to the cam member being incated at 62. The position of the cam follower obviously will depend upon the distance of the axial movement of plunger or piston 40 in reference to stationary casing 51. A change in the position of cam member 58 permits an adjustment of the load range within which the turbine may rapidly open. If the opening of the turbine continues beyond the adjusted range for such rapid opening, the opening time, as controlled by displacement of piston 2 toward the left will be extended in accordance with the free flow area of throttling valve 27 as adjusted. The space in casing 51 above cylinder 39 is connected to the atmosphere, preferably through a filter 74.

*Operation of the regulating device in response to a rapidly increased load and an opening of the guide wheel of the turbine due to such increase*

An increase in the load demand on the turbine results in a decrease in the r.p.m. of the turbine. As a result, the output shaft 4 of governor 3 will move upwardly. Such upward movement of shaft 4 is transmitted by lever 6 to valve shaft 5a and causes the shaft, and with it slides 15 and 16, to move upwardly. Oil now flows from pipe 13 through slide 16, pipe 18 and chamber 23, past valve member 21 to chamber 22 and through pipe 19 into cylinder space 12 to cause displacement of piston 2 toward the left; that is, in the direction for opening the turbine. Oil is discharged from cylinder space 11 through pipe 17, slide 15 and discharge pipe 14.

Valve member 21 is in its fully raised position at the beginning of the opening of the turbine due to the aforedescribed arrangement of the second servomechanism associated with valve 20. Accordingly, piston 2 will move toward the left and thus opening of the turbine at maximal speed.

The movement of piston 2 toward the left is transmitted to cylinder 39 via link 7, bellcrank lever arms 8 and 37, and link 38. As previously described, valve 42 is closed by the action of its spring 43, and the free flow area of needle valve 48 is greatly constricted. As a result, plunger 40 will follow the upward movement of cylinder 39 with very little lag. In other words, plunger 40 will move practically in unison with cylinder 39. As a result of the upward movement of plunger 40, collar 54 moves upwardly with piston rod 41, thereby increasing the loading of spring 53. Cam member 58 also follows the upward movement of rod 41. If now the increase in the load demand is so high that the permissible stroke for rapid opening of the turbine, as represented by the flat upper portion 58a of the cam member, is exceeded, the contiguous slanted portion 58b of the cam surface will force cam follower 59 outwardly, say, into the position indicated at 62. As a result, bellcrank lever 33, 34 is pivoted about its pivot axis 56, and lever arm 34 presses roller 35, and with it valve slide 63, upwardly. As a result, the slide closes the pressure connection between pipe 29 and pipe 30 and instead connects pipe 30 to pipe 32, which, in turn, leads to discharge pipe 14.

As a result of the drainage of chamber 31, piston 24 moves downwardly, assisted by a spring 64. Valve member 21 follows the downward movement of the piston, due to lower end of the valve member's stem engaging at 65 a shoulder on piston rod 24a of the piston. The downward movement of valve member 21 is assisted by a spring 66 and also by a pressure differential between chambers 23 and 22, due to the decrease in the free flow area between the valve member and its seat 25. When the valve member comes to rest on its seat 25, the passage for oil between the valve member and its seat is closed, and the oil is now forced to flow from chamber 23 through pipe 26, throttling valve 27 and pipe 19 into cylinder space 12 to continue movement of piston 2 in the direction of opening the turbine. Hence, the last part of the opening movement of the turbine, as controlled by the displacement of piston 2, will occur at a reduced rate in comparison with the rate of movement of the piston by the action of the oil when flowing directly from chamber 23 to chamber 22 past valve member 21. This reduced rate of flow can be conveniently adjusted to a desired value by correspondingly setting valve 27. Accordingly, the flow of spent water into the surge tank can be regulated so that the water can be easily accommodated by the surge tank.

When piston 2 reaches the position which corresponds to the change in the load demand, slide 5a of the main pilot valve 5 is returned into the illustrated position via link 7, bellcrank lever arms 8 and 9, link 10 and balancing arm 6, the position of shaft 4 of governor 3 now permitting such return.

Spring 53, which has been loaded due to the upward movement of plunger 40 during the opening of the turbine, as previously described, slowly returns the plunger into its initial position. Cam member 58 moves in unison with the plunger, and as a result, bellcrank lever 33, 34 permits the return of the slide 63 of second control valve 28 into the illustrated position. Oil is again fed from supply pipe 13 through pipe 29, valve 28 and pipe 30 to chamber 31. The pressure building up in the chamber will cause lifting of piston 24 and thus also of valve member 21. Oil is now fed from supply pipe 13, slide 16 of valve 5 and pipe 18 directly through chambers 23 and 22 to pipe 19, and thus to cylinder space 12. A space 67 in cylinder 68 above piston 24 is drained through a bore 24b in piston rod 24a, and oil is discharged from the cylinder at the bottom thereof.

Under special operational conditions it may be advantageous to effect a slow opening of the turbine for the entire displacement of piston 2; that is, for the entire load range. Such slow opening may be easily effected by means of solenoid 72. An energizing circuit for the solenoid coil is closed by operating a push button 70. As is evident, the attraction of the solenoid will lift the valve shaft of valve 28 via coupling 69 in the same manner as the valve shaft is lifted when cam follower 57 reaches a position such as position 62. Valve 28, when its shaft is lifted by solenoid 72, will cause closing of valve member 21, thus forcing the oil to flow again through the constricted passage provided by throttling valve 27. Solenoid 72 locks itself in its lifted position by means of a nose 72a engaging a second solenoid 73. Solenoid 72 can be released by energizing solenoid 73 by a second push button 71. The solenoid 72 when released will fall down, so that valve 28 can return into the illustrated position. As is apparent, coupling 69 permits displacement of the shaft of the valve by the action of cam follower 57 independent of solenoid 72.

Button 70 may be connected to a float-operated switch in the surge tank. The switch will close the energizing circuit for solenoid 72 when the float of the switch detects an excessively high water level in the tank.

*Operation of the regulating device in response to a rapid decrease in the load demand on the turbine*

A decrease in the load on the turbine causes closing of the guide wheel of the turbine and the r.p.m. of the turbine increases as the load decreases, whereby governor 3 causes a downward movement of its shaft 4. As a result, balancing arm 6 will move slide shaft 5a of the main pilot valve 5 downwardly and into a position in which oil is fed from supply pipe 13 through valve slide 15 and pipe 17 to cylinder space 11. As a result, piston 2 will be displaced toward the right; that is, the direction for closing of the turbine. Oil is discharged from cylinder space 12 through pipe 19, chamber 22 and 23, past valve member 21, pipe 18 and valve slide 16, now open, to pipe 14. Piston 2 moves toward the closing position at the maximum acceptable rate of speed, irrespective of whether valve member 21 is open due to oil pressure in chamber 31 below piston 24 or the afore-described discharge path through pipe 30 for chamber 31 has been opened, as previously described, and valve member 21 has moved downwardly into its closing position.

In the event valve member 21 is in its closing position, the valve member is lifted to open the passage for the drainage of oil from cylinder space 12 by arranging valve member 21 so that it can move lengthwise in reference to the piston rod 24a with which the valve member is in engagement at 65, as previously described. The lengthwise displacement of the valve member preferably is limited to a distance which corresponds to the complete opening movement of the valve member.

As previously described, the change in the position of governor shaft 4 at the beginning of the closing operation causes a movement of valve shaft 5a into a position in which valve slide 16 connects pipe 18 to discharge pipe 14. As a result, the pressure in pipe 18 becomes very low. When now piston 2, due to the build-up of pressure in cylinder space 11, continues its movement toward the right—that is, in the closing direction—a certain pressure build-up occurs in cylinder space 12 also. This pressure build-up is transmitted to chamber 22 and acts upon the lower side of valve member 21 resting on its seat 25. Due to the afore-described pressure drop in pipe 18, the pressure in chamber 23 is also low, and the resulting pressure differential lifts valve member 21 to the extent required to permit movement of piston 2 at the required speed for closing. When and while no oil is flowing through valve 20, valve member 21 is maintained in its closed position by the action of spring 66, provided piston 24 is in its lowest position.

The movement of piston 2 toward the right is transmitted through link 7, bellcrank lever arms 8 and 37 and link 38 to cylinder 39. As a result, the cylinder will move downwardly in reference to its plunger 40. Such downward movement of the cylinder will cause a sub-atmospheric pressure in cylinder space 44, while cylinder space 45 remains at atmospheric pressure, being connected to the atmosphere via filter 74. The pressure differential will cause opening of valve 42 against the action of spring 43 thereof. A substantial passage area for the flow of oil is now open through bores 46 and past valve plate 42. In other words, oil can now freely pass from space 45 to space 44 without plunger 40 being compelled to follow the downward movement of cylinder 39 due to the displacement of piston 2 toward the right. Accordingly, valve member 48, which is coupled to plunger 40, as previously described, will remain in its illustrated position, and valve 28 will also remain in its illustrated position during the closing of the turbine.

While the invention has been described in detail with respect to a certain now preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. In a water turbine installation in which the opening and closing of the turbine in response to a change in the load demand on the turbine is controlled by a speed-responsive governor and the spent water is discharged through a duct including a surge tank, a control device effecting opening of the turbine at a predetermined speed in response to an increase in the load demand on the turbine within a predetermined part of the total load range of the turbine and decreasing the opening speed of the turbine to a lower rate in response to a load demand in excess of said predetermined rate to maintain the level of spent water flowing into the surge tank below a predetermined maximal level, said device comprising a first servomechanism including a cylinder and a piston, the piston being arranged to be coupled to the turbine to effect opening and closing thereof by the direction of the piston movement; a governor responsive to the speed of the turbine; first conduits connected to spaces in the cylinder of said first servomechanism on both sides of the piston therein for respectively feeding pressure fluid to said cylinder spaces and discharging the same therefrom; a main pilot valve included in said conduits to control the flow of fluid therethrough, said valve being controlled by said governor in accordance with the turbine speed as detected by the governor; a first control valve including two connected chambers one each communicating with one each of said first conduits and a valve member controlling the connection between said chambers; a second servomechanism including a piston coupled to said valve member for controlling the position thereof; second conduits connected to said second servomechanism for controlling the position of the piston thereof; a second control valve included in said second conduits for controlling the flow of fluid therethrough; a third servomechanism including a piston coupled with the piston of the first servomechanism for control of the position of the piston of said third servomechanism by the position of the piston of said first servomechanism, the piston of the third servomechanism controlling the position of said second control valve; control means controlled by the stroke of the piston of said third servomechanism to move the second control valve into one position when said piston stroke is within a predetermined length corresponding to said predetermined part of the load range and into another position when the stroke is in excess of said length, said movement of the second control valve into said other position causing the valve to actuate the second servomechanism to operate the first control valve to close the connection between the two chambers thereof by moving its valve member into a closing position; and bypass conduit means for said two chambers to provide a reduced flow of fluid when said valve member is in its closing position, thereby reducing the rate of movement of the piston of the first servomechanism toward opening of the turbine.

2. A water turbine installation according to claim 1 and comprising adjustable means for varying the interval of time required by the piston of said third servomechanism to return from a displaced position into its initial position, said adjustable means being operable from the outside of the third servomechanism.

3. A water turbine installation according to claim 2, wherein said adjustable means comprise a stationary fluid-filled cylinder in which said piston of the third servomechanism is slidable, said piston including lengthwise bores therethrough, and a throttling valve adjustable from the outside of said third servomechanism for controlling the flow of fluid through said bores.

4. A water turbine installation according to claim 1, wherein said control means comprises a cam member supported by the piston of said third servomechanism for lengthwise movement in unison therewith, a cam follower riding on said cam member, and linkage means coupling said cam follower with said second control valve for controlling the position of said second control valve by the position of the cam follower on the cam member, said cam member having a first portion in engagement with which the cam follower causes displacement of the second control valve into said one position and a second portion in engagement with which the cam follower causes displacement of the second control valve into said other position, said second portion of the cam member being engaged by the cam follower when the stroke of the piston of the third servomechanism exceeds said predetermined length to cause said reduced rate of change in the position of the piston of said first servomechanism.

5. A water turbine installation according to claim 4 and comprising adjustment means for varying the lengthwise position of said cam member in reference to the piston of the third servomechanism, thereby varying said length of the piston stroke in excess of which the second control valve is moved into said other position independently of the position of the piston in the first servomechanism.

6. A water turbine installation according to claim 1, wherein an adjustable throttling valve is included in said bypass conduit means for restricting the flow of fluid through said bypass conduit means during the entire movement of the piston of said first servomechanism.

7. A water turbine installation according to claim 1, wherein said valve member of the first control valve is adjustable relative to the piston of said second servomechanism for setting said valve member in reference to the piston of the second servomechanism in a position in which the fluid pressure in one of said chambers is higher than in the other, said pressure differential causing an opening of said valve member of said first control valve to provide for a full fluid flow from the respective space in the cylinder of the first servomechanism when the piston of said first servomechanism is moving toward closing of the turbine.

8. A water turbine installation according to claim 7, and comprising spring means coacting with the piston of the second servomechanism for biasing said piston toward a predetermined position, and spring means coacting with said valve member for biasing the same toward its closing position.

9. A water turbine installation according to claim 1, wherein said control means comprise a cam member supported by the piston of said third servomechanism for lengthwise movement in unison therewith, a cam follower riding on said cam member, linkage means coupling said cam follower with said second control valve for controlling the position of said second control valve by the position of the cam follower on the cam member, said cam member having a first portion in engagement with which the cam follower causes displacement of the second control valve into said one position and a second portion in engagement with which the cam follower causes displacement of the second control valve into said other position, said second portion of the cam member being engaged by the cam follower when the stroke of the piston exceeds said predetermined length to cause said reduced rate of change in the position of the piston of said first servomechanism, and second control means coacting with said second control valve for controlling the position thereof independently of the position of said cam member.

10. A water turbine installation according to claim 9, wherein said second control means comprise electromagnetic means engageable with said second control means for varying the position thereof in response to energization of the electromagnetic means.

References Cited
UNITED STATES PATENTS

| | | | |
|---|---|---|---|
| 2,247,989 | 7/1941 | Cita | 137—36 |
| 2,681,660 | 6/1954 | Avery | 137—25 |
| 3,152,601 | 10/1964 | Krenikoff | 137—36 |

CLARENCE R. GORDON, *Primary Examiner.*